Oct. 9, 1956
W. VAUGHAN
2,765,523
METHOD OF ATTACHING ARTICLES FOR SELECTIVE
ASSEMBLY WITH DIFFERENT DEVICES
Filed Dec. 30, 1950
3 Sheets-Sheet 3
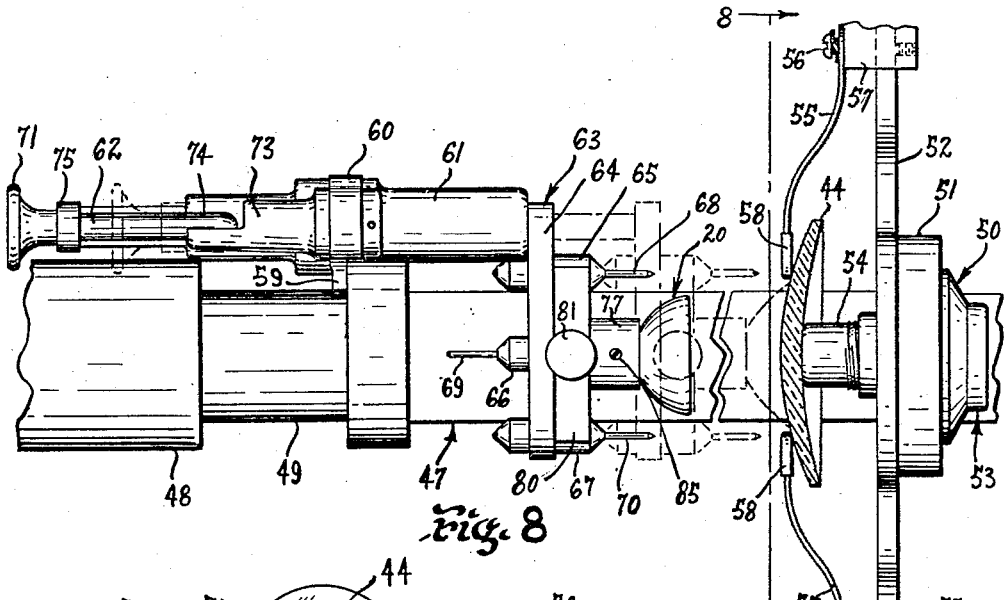
INVENTOR
WILLIAM VAUGHAN
BY
Louis L. Gagnon
ATTORNEY

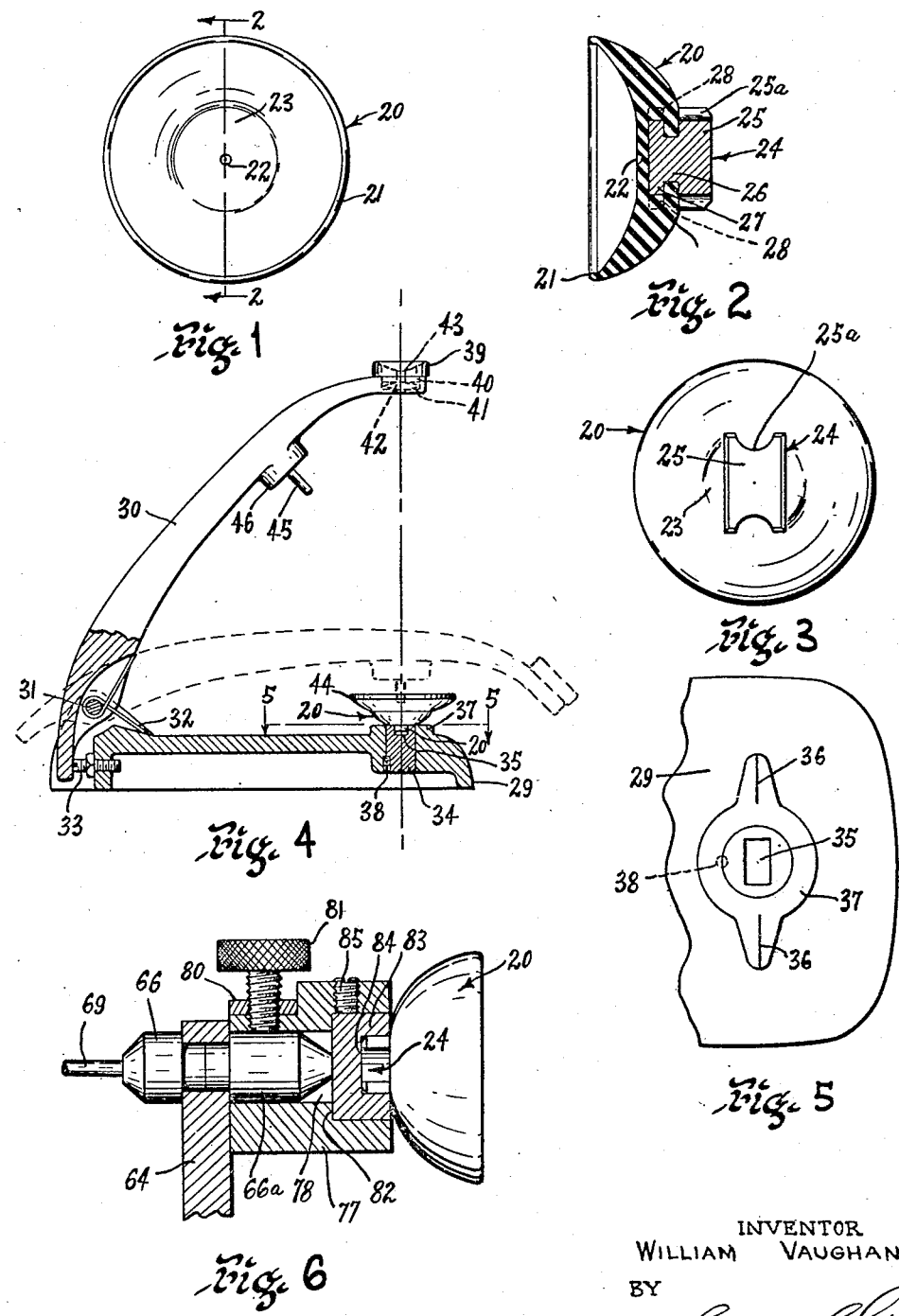
Oct. 9, 1956 — W. VAUGHAN — 2,765,523
METHOD OF ATTACHING ARTICLES FOR SELECTIVE ASSEMBLY WITH DIFFERENT DEVICES
Filed Dec. 30, 1950 — 3 Sheets-Sheet 1
INVENTOR
WILLIAM VAUGHAN
BY
Louis L. Gagnon
ATTORNEY

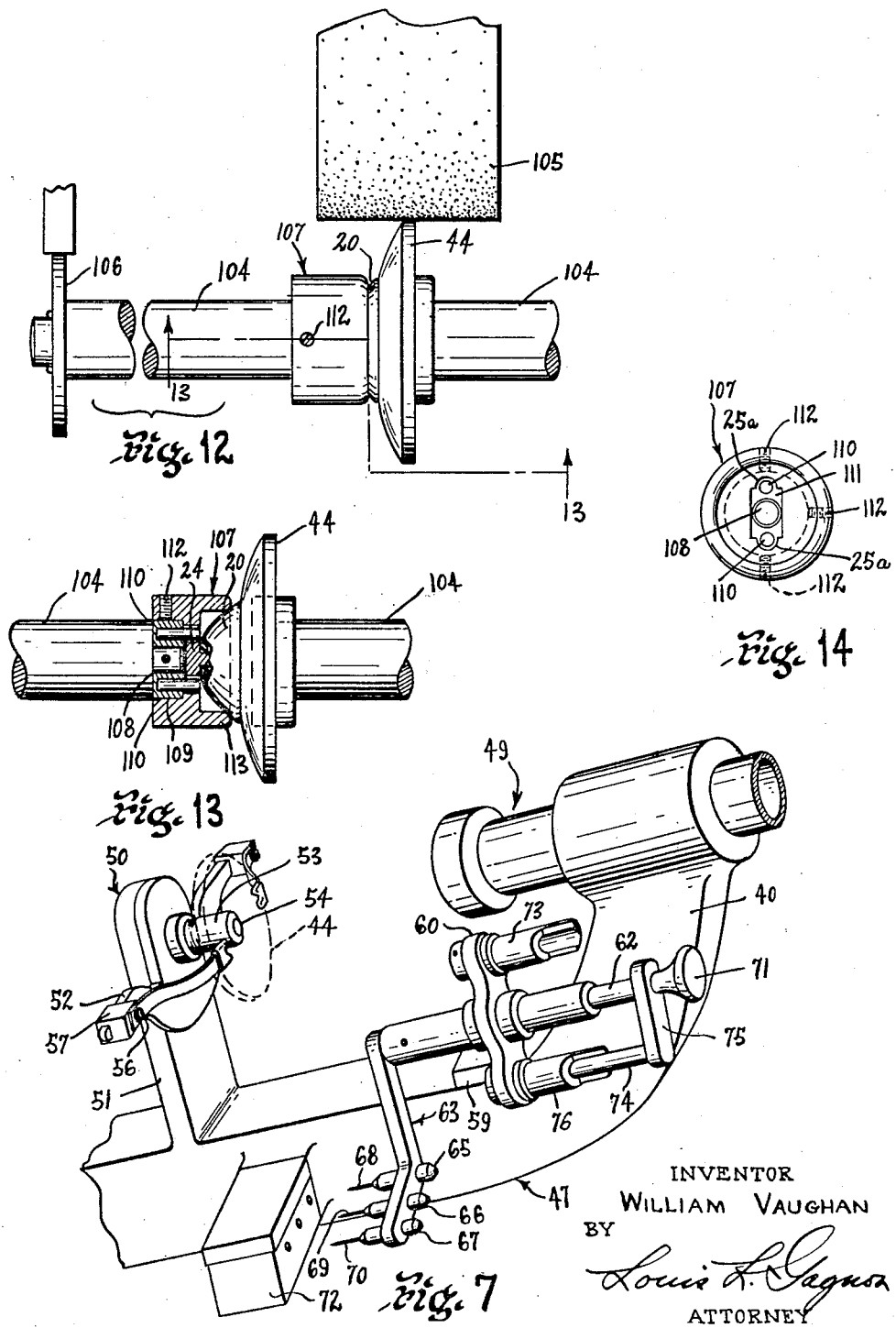

United States Patent Office 2,765,523
Patented Oct. 9, 1956

2,765,523

METHOD OF ATTACHING ARTICLES FOR SELECTIVE ASSEMBLY WITH DIFFERENT DEVICES

William Vaughan, Woodstock, Conn., assignor to American Optical Company, Southbridge, Mass., a voluntary association of Massachusetts Application December 30, 1950, Serial No. 203,603

1 Claim. (Cl. 29—406)

This invention relates to improvements in means for accurately locating a work piece in the holder of a device for performing a fabricational operation thereon, and has particular reference to a method of aligning and holding lens blanks whereby said blanks will be automatically aligned in the holders of various devices for performing different operations thereon.

One of the principal objects of this invention is to provide a method for securely and accurately retaining lens blanks in predetermined centered and axial relation with aligning and holding means by which said blanks may be automatically aligned in the holders of various devices for performing different operations thereon whereby said blanks may be transferred from one to another of the various devices while retaining their established aligned relation with said means.

Another object is to provide a method involving the use of a suction cup for attachment to an article such as a lens, said suction cup being provided with means fixedly secured thereto for subsequent attachment to the holders of various devices for performing different operations thereon, said means being so shaped that when the cup is attached to the holders, or is being transferred from one to another thereof, the article will be constantly retained in desired predetermined centered and axial position whereby the resultant operations will be performed without the possibility of error due to displacement which might occur particularly when the article is being transferred from one device to another.

Other objects and advantages will become apparent from the following description taken in connection with the accompanying drawings, in which:

Fig. 1 is an enlarged front elevational view of a suction cup device embodying the present invention;

Fig. 2 is an enlarged sectional view taken on line 2—2 of Fig. 1;

Fig. 3 is an enlarged elevational view of the device shown in Fig. 1;

Fig. 4 is a side elevational view partly in section of a fixture for attaching lenses to the suction cup devices embodying the invention;

Fig. 5 is a fragmentary top plan view taken on line 5—5 of Fig. 4 and looking in the direction of the arrows;

Fig. 6 is an enlarged vertical sectional view of a device for supporting the suction cup device in a lens centering and marking instrument;

Fig. 7 is a fragmentary perspective view of a lens supported in the lens centering and marking instrument;

Fig. 8 is a fragmentary top plan view illustrating the method of attaching a lens to a suction cup device in the lens centering and marking device;

Fig. 9 is a fragmentary front elevational view illustrating the method of supporting a lens in the centering and marking device;

Fig. 10 is a fragmentary sectional view of the lens supporting table of a lens cutting device illustrating a use of the device embodying the present invention;

Fig. 11 is a fragmentary sectional view taken on line 11—11 of Fig. 10 and looking in the direction of the arrows;

Fig. 12 is a fragmentary front elevational view of a portion of an edging machine illustrating a further use of the device embodying the present invention;

Fig. 13 is a sectional view taken on line 13—13 of Fig. 12 and looking in the direction of the arrows; and Fig. 14 is a front elevational view of one of the holding fixtures of the edging machine.

In the manufacture of articles such as ophthalmic lenses, the lens blanks, prior to being cut to substantially the contour shape desired and subsequently edge ground to the resultant configuration, are generally provided with marks on one of their surfaces for indicating the optical centers and axes thereof. In subsequently providing the blanks with the desired contour shapes, particularly in the cases of irregularly shaped lenses, it is necessary that the lens centers and axes be maintained in predetermined position whereby the resultant lenses, when mounted in positions of use, will be accurately located and perform efficiently.

In producing a lens by many prior art methods, it has been necessary to provide means associated with the cutting device for axially aligning and centering a lens blank prior to the cutting operation, and then after removing the cut blank from the device it has been necessary to align and center it in a separate fixture for holding it to an edging machine in desired relation with respect to a pattern. Since in the edging operation the pattern rotates with and controls the resultant contour shape of the lens, it is, therefore, essential that the lens blank be mounted with its optical axes in predetermined relation with the known axes of the pattern.

The present invention differs from and improves upon known prior art means and methods by the provision of simple and practicable suction cup device for supporting a lens blank in predetermined axial and center position whereby it may be properly mounted successively in the holders of a number of instruments or machines without requiring realignment of the blank prior to each operation or the use of additional separate fixtures which might become easily misplaced or damaged or which might permit the inadvertent misalignment of the lens during the transfer to said respective instruments or machines. The present invention also obviates the necessity of providing the instruments or machines with separate intricate and expensive means for aligning and centering the lens blank prior to the operations to be performed thereon.

Referring more particularly to the drawings wherein like characters of reference designate like parts throughout the several views, a preferred embodiment of the invention comprises a suction cup 20 formed of rubber or similar resilient material and preferably having its outer peripheral edge formed with a thin annular bead 21 which aids in the holding function of the device. The cup 20 is substantially bowl-shaped and the walls or sides thereof have relatively thin marginal portions which increase in thickness toward the base which is of substantial thickness and rigidity. The cup is provided on its inner surface with a centrally located alignment mark 22 such as a bull's-eye, cross, dot, recess or similar means for use in aligning the center of a lens blank to be attached to the cup 20 as will be more fully described hereinafter. The rear of the base portion 23 of the cup 20 is formed with a hollowed out area which is adapted to receive one end of a block 24. The block 24 is preferably formed of metal or other rigid material and has a main body portion 25 which is substantially rectangular in shape and a short neck portion 26 which extends into the material of the cup 20 and terminates in a flat plate-like or flange portion 27 which is embedded in the hollowed out area of the cup. The block 24 is attached to the cup 20 preferably at the time the cup is molded since it is essential that it be immovably and permanently connected thereto. To insure that the block 24 will not move with respect to the cup 20 after assembly therewith, the block is formed with a pair of spaced protrusions 28 at each end of the plate-like or flange portion 27. Thus, when molding the cup 20, material from which the cup is formed will fill in the space between the protrusions 28 and between the plate-like or flange portion 27 and main body portion 25, thus immovably uniting the parts.

The body portion 25 of the block 24 may, if desired, be formed to other predetermined irregular shapes, other than circular, it being necessary, however, to provide means on the instruments or machines with which the device is to be used which are provided with cavities for receiving the block and which, therefore, must be shaped to comate therewith. The ends of the body portion 25 are notched 25a as clearly shown in Figs. 2, 3, 13 and 14 for reception of pins carried by holders used in edging machines as will be described hereinafter.

A special fixture, illustrated in Fig. 4, is preferably used for attaching a lens blank to the suction cup 20 and comprises a base 29 and an arm 30 having one end pivotally connected to one end of the base as at 31. A spring 32 normally urges the arm 30 into an upright position while an adjustable stop 33 carried by the end of the base 29 is adapted to be engaged by the arm 30 to limit the extent of upward movement thereof.

The base 29 carries adjacent its other end a cylindrical aligning chuck 34 which is provided in its upper end with a recess 35 (Fig. 5) shaped to receive the block 24 on the suction cup 20. The chuck 34 is adapted to be rotated in the base 29 to align the recess 35 with respect to a pair of spaced indicating lines 36 located on a raised portion 37 of the base 29 and to be subsequently locked in aligned position by means of a screw 38.

The free end of the arm 30 is adapted to be normally positioned above the chuck 34 and carries on its upper surface a disc-like member 39 having an extension 40 formed integral therewith. The extension 40 is positioned within a recess 41 formed in the arm 30 near the end thereof. Between the end of the extension 40 and inner surface of the recess 41 is located a lens 42 and a sight opening 43 is formed in the member 39 and extension 40 thereof whereby an operator can sight toward the chuck 34 through the sighting lens 42. Thus, when a suction cup 20 is positioned on the chuck 34 with the block 24 located in the recess 35, a lens blank 44 can be positioned on the cup 20 and centered with respect to the identification mark 22 by the operator when sighting through the sight opening 43. It is to be understood that the lens blank 44 must have been previously provided with identification marks indicating its optical center and axes. At the time the lens blank is being centered it can also be axially aligned with the identification marks 36 formed on the base 29. The sighting opening 43, being elongated and of small diameter, prevents parallax errors and the sighting lens 42 provides the necessary visual accommodation for the distance between the sight opening and chuck.

After the lens blank has been centered and aligned the arm 30 is swung downwardly about the pivot 31 to a position where one or more pins 45 extending from a block 46 attached to the lower surface of the arm 30 engage the lens blank 44. Continued pressure will force the lens blank 44 against the suction cup 20 and cause it to become attached thereto.

Thus, since the cup 20 and block 24 are held in prelocated axial position, it is apparent that a lens blank can be attached to the cup 20 in predetermined and controlled axial and centered relation, therewith.

However, in instances where it is desired to attach a lens blank to a suction cup without the fixture shown in Fig. 4, this can be accomplished in an instrument such as a lensometer of the type shown and described in U. S. Patent 1,542,112, issued to E. D. Tillyer, June 16, 1925. A fixture such as shown in Fig. 6 of the drawings of the present invention can be used to support a suction cup in proper position for attachment to a lens blank supported by a lensometer which is partly shown in Figs. 7 and 8. In Figs. 7 and 8 only the parts of the lensometer are shown which are necessary to illustrate the present invention.

The lensometer is provided with an elongated base 47 which is formed at one end with an upwardly extending supporting portion 48 which carries a telescope 49. The telescope 49 is directed toward a lens blank supporting device 50 which is carried by an arm or stand 51 or the like extending upwardly from the base 47. A horizontally disposed arm 52 is affixed to the top of the stand 51 and a nose 53 is adapted to extend through the arm 52 and stand 51, the forward end 54 thereof extending outwardly of said arm 52 toward the telescope 49. The nose 53 is hollow so that light emanating from a source located at the rear of the device will be directed through a target (not shown) and through the nose 53 onto a lens blank 44 positioned against the end 54 of the nose 53.

Suitable means is provided for retaining the lens blank 44 in position against the nose such as a pair of resilient spring-like arms 55 located one on each side of the lens blank, the arms 55 having their outer ends secured as by screws 56 to blocks 57 carried by the arm 52 and having their inner ends provided with pads 58 of resilient material for engaging marginal portions of the lens blank 44 and urging it, through the inherent resiliency of the arms 55, against the nose 53.

The lens blank 44 thus can be viewed through the telescope 49 and can be centered and axially aligned with respect to the target (not shown) in the usual manner of operating a lensometer.

The lensometer is further provided with a marking device which is supported upon the base 47 by a brace 59 and embodies a bracket 60 having a tubular member 61 extending therethrough substantially parallel to the telescope 49, with a shaft 62 being rotatable within said tubular member 61. The end of the shaft directed toward the lens blank supporting device 50 has one end of an angularly extending L-shaped arm 63 fixedly attached thereto. The arm 63 is normally directed downwardly with a portion 64 thereof directed outwardly of the device. The portion 64 is provided with three bushings 65, 66 and 67, each of which contains a retractable pin 68, 69 and 70 respectively.

The other end of the rotatable shaft 62 is provided with a knob 71 whereby the shaft 62 may be pushed inwardly of the tubular member 61 against the tension exerted by spring mechanism (not shown) associated therewith, which movement will consequently cause the L-shaped arm 63 to move toward an ink supply box 72 (Fig. 9) carried by the base 47, whereupon the pins 68, 69 and 70 will enter the box 72 through openings provided therefor, and upon release of the knob 71 the parts of the device will automatically return to their initial positions.

In the conventional use of the lensometer, the knob 71 will then be rotated to a position where the pins 68, 69 and 70 will be positioned in front of and adjacent to the lens blank 44. This position is controlled by means of an elongated stop member 73 carried by the bracket 60, which member 73 is adapted to be engaged by a stud 74 carried by an arm 75 attached to the shaft 62 adjacent the knob 71. When the stud is in engagement with the stop member 73 further rotation of the shaft 62 is prevented, and the knob 71 can then again be pushed toward the tubular member 61 to cause the inked pins 68, 69 and 70 to engage the adjacent surface of the lens blank 44 and mark the center and axis of the blank thereon. A second stop member 76 is secured to the other end of the bracket 60 to similarly ensure alignment of the pins with the openings in the ink supply box 72.

However, in accordance with this invention, means is provided for attaching a suction cup 20 to the lens blank 44 after the blank has been centered and axially aligned in the lensometer. Such means is in the form of a fixture comprising a tubular member 77 (Figs. 6 and 8) the longitudinal bore 78 thereof being shaped to receive the forward end portion 66a of the middle bushing 66 which carries the retractable marking pin 69. The tubular member 77 has a flattened surface area formed adjacent its rear end to which is fixedly secured as by welding or other suitable means a transverse locating arm 80. When the tubular member 77 is positioned on the bushing 66, the locating arm 80 is adapted to rest upon the adjacent bushings 65 and 67 thereby preventing rotation of the member 77 on bushing 66. The member 77 is retained in position on the bushing 66 by means of a thumb screw 81.

The forward end of the bore 78 is enlarged to form an annular shelf 82 and a rotatable bushing 83 is located in the enlarged portion of the bore. The bushing 83, in being inserted in position, is adapted to push the pin 69 rearwardly in its respective bushing 66, and when in preferred position rests against the shelf 82. The outer surface of the bushing 83 is provided with a recess 84 which is shaped to receive the block 24 on the suction cup 20 similarly to the recess 35 of the aligning fixture shown in Fig. 4.

The bushing 83 can be rotated in the tubular member 77 to align the recess 84 whereby the suction cup 20 will be in desired axial position when attached thereto and is secured in the desired position by a set screw 85.

When such a fixture is attached to the marking device as described with a suction cup secured thereto, the marking device is moved by manual manipulation of knob 71 to the position normally used for the actual lens marking operation, which position is controlled by the engagement of stud 74 with stop 73 as described hereinbefore. Pressure upon knob 71 will then cause the marking device arm 63 to move toward the previously centered axially adjusted lens blank 44. This will cause the suction cup 20 to engage the lens blank 44, as shown by dot-dash lines in Fig. 8, and become secured thereto through its inherent vacuum holding characteristics.

Upon releasing knob 71 the suction cup 20 will remain attached to the lens 44 and the arm 63 can be returned to its normal inoperative position.

The lens blank 44, after being thus axially aligned and centered with respect to the suction cup 20, can then be transferred to cutting and edging machines without alteration of its known axial and centered relation with the cup 20. A lens cutting device of the type shown and described in U. S. Patent 1,621,331, issued March 15, 1927, to A. E. Maynard can be provided with an adapter for receiving the suction cup 20 with a lens blank attached thereto. Such a device is partially shown in Figs. 10 and 11.

An adapter indicated by numeral 87 in Figs. 10 and 11 is provided with a recess 86 which is shaped to receive the block 24 on the cup 20, with the recess 86 being in predetermined centered and axial relation with a pattern or former (not shown) for controlling the contour shape of the lens blank 44 during the cutting operation.

The recess 86 is formed in the upper end of an adapter 87 which is slidably mounted in a hollow shaft 88 extending downwardly from a gear wheel 89. The shaft 88 is adapted to rotate within a bushing 90 fixedly mounted in a bore formed in the base portion 91 of the device. The gear wheel 89 is adapted to be rotated by a drive gear 92 (Fig. 11) which is in turn rotated by drive mechanism not shown. The gear wheel 89 has secured thereto a fixed pad supporting disc 93 which in turn carries a pad 94 formed of resilient material. The pad 94 has a concave upper surface for receiving the convex surface of the lens blank 44. The pad 94, disc 93 and gear wheel 89 are formed with coaxial openings through which the suction cup 20 and block 24 extend, whereby the block 24 can be made to engage the recess 86.

In order that the lens may be rotated during the cutting operation, a disc 95 is fixedly carried by the upper end of the adapter 87 and carries a key 96 which is adapted to engage a slot formed on the inner edge of the disc 93 which is carried by the gear wheel 89. Thus, when gear wheel 89 is rotated, this will consequently cause simultaneous rotation of the disc 95, adapter 87, block 24, suction cup 20, and lens blank 44.

A conventional clamp arm 97 having a portion 98 thereof in engagement with the upper surface of the lens blank 44 functions to maintain the blank in desired position on the pad 94. A spring 99 mounted in the shaft 88 and retained therein by a plug 100 constantly urges the adapter 87 into engagement with the block 24. The adapter 87 is, however, formed with a portion of small diameter 101 for receiving the end of a set screw 102 which is carried by the shaft 88 for limiting the movement of the adapter 87 longitudinally of the shaft 88.

Since the adapter 87 having the recess 86 therein is mounted in predetermined centered axial relation with the pattern aforementioned (not shown) and for simultaneous rotation therewith, the cutting tool 103 which engages the lens blank 44 will provide the blank 44 with a contour shape in accordance with the shape of the pattern, as is fully described in the aforementioned Maynard patent.

In order to provide the lens blank 44 with the desired final contour edge shape the blank 44 is subsequently transferred to an edging machine such as shown and described in U. S. Patents Nos. 1,470,995, Maynard et al., October 16, 1923; 1,490,178, Maynard et al., April 15, 1924; 1,685,159, Gunning, September 25, 1928; and others.

In such edging machines a lens 44 to be edged (see Figs. 12, 13 and 14) is placed between the ends of a pair of axially aligned rotatable shafts 104. The lens 44 is caused to be rotated about its predetermined center by the shafts 104 and to be brought into engagement with an abrading wheel 105 whereupon the contour edge of the lens 44 will be abraded to a desired resultant size and shape, which resultant size and shape is controlled by a former or pattern 106 carried by one of the shafts 104 and rotatable therewith.

In performing such an operation, however, it is important that the lens 44 be axially aligned and centered with respect to the pattern 106 in order that the axis and center of the resultant lens will be located as desired when the lens is subsequently mounted in a frame or other supporting means.

The present invention easily, simply and efficiently permits immediate and accurate location of the lens 44 with respect to the pattern 106 through the provision of an adapter 107 which is carried by one of the shafts 104. The selected shaft 104 is provided with an end portion 108 of small diameter over which is secured a collar 109 carrying a pair of diametrically opposed pins 110 therein. The adapter 107 to which the lens is to be secured is adapted to be mounted on the end of the shaft 104 and rotated to desired axial position and secured therein by set screws 112. The adapter 107 is provided in its central area with a recess 111 having irregular end walls shaped to receive the pins 110 (Fig. 13) which form a part of certain conventional edging machines.

It is to be understood, therefore, that the shaft thus carries the adapter in predetermined centered and axial position, the adapter being thus consequently aligned and centered with respect to the pattern.

In accordance with this invention, the recess 111 in the adapter 107 is shaped to receive the block 24 secured to the suction cup 20 carrying the lens 44. Thus the lens 44 is held in predetermined aligned relation with the pattern whereupon the final edging operation can be accurately performed.

It is to be noted here that the adapter 107 is provided with a peripheral rim 113 the edge of which bears upon the suction cup 20. Thus the driving force for rotating the lens is transmitted from the adapter 107 directly to the cup 20 rather than through the block 24.

From the foregoing it will be seen that novel means of a simple and efficient nature have been provided for accomplishing all of the objects of this invention through the provision of a suction cup for holding a lens in predetermined aligned and centered relation with respect to supporting means for supporting the lens in an instrument or machine.

It will be apparent that many changes may be made in the details of construction and arrangement of parts shown and described without departing from the spirit of the invention as expressed in the accompanying claim. Therefore, it is to be understood that all matter set forth or shown in the accompanying drawing is to be interpreted as illustrative and not in a limiting sense.

I claim:

The method of attaching a semifinished lens blank having center and axis markings thereon to a holding device embodying a suction cup having a center marking thereon and an attaching member carried thereby for universal assembly in only one meridional direction with the adaptors of mechanisms for performing different fabricational operations on said semifinished lens blank comprising providing a device having a base with adaptor means thereon for receiving and holding the attaching member of said holding device in said one meridional direction, said base, adjacent said adaptor means, having an axis marking thereon, a lever pivotally connected with said base having contact means thereon movable toward and away from the adaptor means in response to pivotal movement of said lever and said lever, on the upper free end thereof, having a sight opening therein adapted to assume a given spaced axially aligned relation with said adaptor means when the lever is in its uppermost position, placing the attaching member and said suction cup in assembled relation with said adaptor means, placing the semifinished lens blank in overlying relation with said suction cup, sighting through the sighting means and aligning the center and axis markings on said semifinished lens blank with the center marking on said suction cup and with the adjacent axis marking on said base respectively to locate said lens blank in predetermined centered and axial relation with said suction cup and forcing said lever downwardly to cause the engagement means thereon to engage the lens blank and exert a pressure on said lens blank of an amount sufficient to force it into holding relation with said suction cup in said centered and axial relation.

References Cited in the file of this patent
UNITED STATES PATENTS

| | | |
|---|---|---|
| 659,815 | Huestis | Oct. 16, 1900 |
| 1,344,700 | Loomis | June 29, 1920 |
| 1,730,799 | Bowes | Oct. 8, 1929 |
| 1,749,620 | Winslow | Mar. 4, 1930 |
| 2,050,385 | Junod | Aug. 11, 1936 |
| 2,091,050 | McKechnie | Aug. 24, 1937 |
| 2,127,181 | Mattern | Aug. 16, 1938 |
| 2,131,687 | Kaplan | Sept. 27, 1938 |
| 2,384,334 | Olson | Sept. 4, 1945 |
| 2,603,922 | McCarthy | July 22, 1952 |
| 2,614,949 | Sachs | Oct. 21, 1952 |
| 2,644,355 | Greco | July 7, 1953 |